United States Patent
Lin

[11] Patent Number: 6,001,290
[45] Date of Patent: Dec. 14, 1999

[54] PROCESS FOR THE PRODUCTION OF A BIAXIALLY ORIENTED POLYPROPYLENE SYNTHETIC PAPER OF HIGH GLOSS AND EASY-DRYING PRINTABILITY

[75] Inventor: Allen Fong-Chin Lin, Taipei, Taiwan

[73] Assignee: Nan Ya Plastics Corporation, Taipei, Taiwan

[21] Appl. No.: 09/131,833

[22] Filed: Aug. 10, 1998

[51] Int. Cl.[6] .................................................. B29C 47/00
[52] U.S. Cl. ........................ 264/129; 264/132; 264/455; 156/244.17; 156/244.24
[58] Field of Search ...................... 156/244.71, 244.24, 156/244.26, 272.6; 427/412.3, 536, 365, 366; 264/129, 132; 524/556, 560, 565, 566, 425

[56] References Cited

U.S. PATENT DOCUMENTS

| | | | |
|---|---|---|---|
| 3,773,608 | 11/1973 | Yoshimura et al. ................ | 161/168 |
| 4,121,006 | 10/1978 | Harada et al. ..................... | 428/172 |
| 4,652,409 | 3/1987 | Leese et al. ........................ | 264/22 |
| 5,484,560 | 1/1996 | Moriyama et al. ................ | 264/483 |
| 5,552,011 | 9/1996 | Lin ..................................... | 156/244.17 |
| 5,637,366 | 6/1997 | Davis et al. ........................ | 428/35.8 |

*Primary Examiner*—Jeff H. Aftergut
*Assistant Examiner*—R. Hendrix
*Attorney, Agent, or Firm*—Bacon & Thomas

[57] ABSTRACT

This invention disclose a process for producing a multi-layer biaxially oriented polypropylene synthetic paper of improved gloss and easy-drying printability by means of 3-layer co-extrusion wherein two different PP resin composites are separately extruded by one primary and two secondary extruders and then co-flowed by a same T-die to form a paper sheet having three layer coating material sheet, and through cooling, bi-axial orientation, surface-coating by prime coating and top coating, winding and calendering to be a synthetic paper depending on the required thickness.

2 Claims, 6 Drawing Sheets

PROCESS FOR THE PRODUCTION OF A BIAXIALLY ORIENTED POLYPROPYLENE SYNTHETIC PAPER OF HIGH GLOSS AND EASY-DRYING PRINTABILITY

FIELD OF THE INVENTION

This invention relates to a process for producing a polypropylene (hereinafter as PP) synthetic paper, and more particularly to a process for producing a multi-layer biaxially oriented polypropylene synthetic paper of improved gloss and easy-drying printability.

BACKGROUND OF THE INVENTION

Nowadays the paper made of natural pulp is replaced with the polyolefin synthetic paper mainly comprising the basic substrate layer (intermediate Layer) in the intermediate Layer called biaxially oriented polypropylene (hereinafter, abbreviated as BOPP), whereon the back surface is laminated with the uniaxially oriented polypropylene (UOPP) containing inorganic fine powder as the paper surface layer (such as the Japanese Patent publication No. 40794/71, Japanese Laid-open Publication No. 141339/81). Moreover, for improving gravure printability, coating composition comprising liquid acrylic copolymer and polyethyleneimine can be coated onto the surface to give 0.005–0.1 g$\text{lm}^2$ (the Japanese Laid-open Publication No. 10624/75, No. 161478/75); The Japanese Laid-open Publication No. 87255/91 discloses a composite film of opacity over 90% made from a biaxially oriented polymer film to serve as a substrate layer (intermediate layer) which is formed by resin composition of high crystallinity polypropylene in isotacticity over 98% of 35–95% weight and talc and/or mica powder of 5–65% weight, and a uniaxially oriented polymer film adhered hereonto at least one surface of the intermediate layer by resin composition of high crystallinity polypropylene in isotacticity over 98% of 20–90% weight and inorganic filler powder in 10–80% weight.

Such a synthetic paper can contact closely with printing head, and provides the merits of rigidity-mechanical strength, but leaves the drawbacks on the ink drying speed. The amount and crosslinking of synthetic paper pore is inferior to that of cultural paper. As a result, printing ink takes quite a long time before completely dried, that is why it is unsuitable for cultural paper (in the case of 4-colour printing it takes 8 hours for drying). Also, the amount of stacking is limited to prevent unneeded reverse printing. Thus, it will increase the man-hours and space for drying in the 4-color printing process. Furthermore, due to the surface layer is the uniaxially oriented polypropylene firm containing inorganic fine filler, poor transfer of ink upon offset printing often occurs in multicolor continuous offset printing and also in both surface printing.

This poor ink adhesiveness must be improved by increasing the ink outlet to reach the required color saturation. Meanwhile, to avoid the deformation of paper surface and the variation of paper dimension by the ink solvent, the specific ink is used for printing which is 3–4 times price of those used in the natural paper.

These drawbacks mentioned above specify the different expense during the printing process between the uniaxial oriented polypropylene synthetic paper and the natural paper also explain why the natural paper can not be replaced in various uses.

Nissin textile Company (Japan) produces the synthetic paper by forming a layer with surface treatment in the extensible or non-extensible films of PP, polyvinyl chloride, Polystyrene, and Polyester. The properties on dryness and printability of the afore paper though are far better than those of the uniaxial oriented PP synthetic paper containing inorganic filler. In general conception, it should be able to replace the natural paper extensively. As a matter of fact, this synthetic paper costs higher than those of various items of natural paper Accordingly, its market sale is inferior to that of the uniaxial oriented PP synthetic pa-containing inorganic filler. In its manufacturing process, it utilizes DMF as the solvent for the surface treatment, and causes a large amount of poison water, which subsequently demands a costly investment for dealing with poisonous drainage to prevent great detriment to environment. In addition, the reverse coater required for using the DMF solvent system will cause a quite thick paper layer (about 30$\mu$ for general type and 10–20$\mu$ for special product use), not available for coating layer under 10$\mu$ with excellent paper surface quality.

The aforesaid factors will certainly increase the cost (such as materials, facilities) during the coating process, as a result, not suitable for extensively adopting synthetic paper to replace of natural paper except for some specific use.

In order to produce a low-cost synthetic paper without drawbacks mention above to be able to extensively replace of natural paper in cultural paper use, the applicant had spent quite a long time for thinking, and finally got a Taiwanese patent, No. 85100270, which mainly use a method such as co-extrusion in which the different melts of polymers are extruded from one primary extruder and two secondary extruders separately prior to extruding them simultaneous through a single main "T" die for forming a three-layer sheet and then through cooling and shaping, biaxially orientation, electric halo treatment and laminating/rolling to be a synthetic paper with required thickness. At last, surface treatment for coating on the paper surface obtains a biaxially oriented PP synthetic paper of easy drying printability.

The synthetic paper made from the method of Taiwanese patent No. 85100270 is almost the same as art paper in using of kind and amount of inks, the dryness and quality of printings, and the amount and crosslinking of minute pore. Its some features are superior to traditional paper, but the surface gloss and the color vividness are inferior to them. The original surface of art paper is rugged which is required for pressed several times for smoothing.

In order to solve the drawbacks for being unable to raise up the gloss of paper, quality of surface and its printings, and the problem for the big loss of paper thickness during the foggy facing process of art paper which prevents the endeavor for the improvement of paper ruggedness (now, the best ruggedness of paper in the world is 0.8–0.9$\mu$), the applicant of present invention experienced a number of experiments trying to figure out a different way not only from the existing arts but better than them. The applicant finally creates the invention which provides merits over traditional synthetic papers in product cost, quality (such as surface gloss, printing gloss, ink drying speed), and over art paper in specific gravity, surface ruggedness, and printing resolution.

SUMMARY OF THE INVENTION

It is therefore an object of the present invention to provide a process for producing a multi-layer biaxially oriented polypropylene synthetic paper of improved gloss and easy-drying printability. More particularly the process for producing the polypropylene synthetic paper, by means of 3-layer co-extrusion wherein two different PP resin composites are separately extruded by one primary and two secondary extruders and then co-flowed by a same T-die to form a paper sheet having three layer coating material sheet, and through cooling, bi-axial orientation, surface-coating by prime coating and top coating, winding and calendering to be a synthetic paper depending on the required thickness.

DETAILED DESCRIPTION OF THE INVENTION

Figure 1:
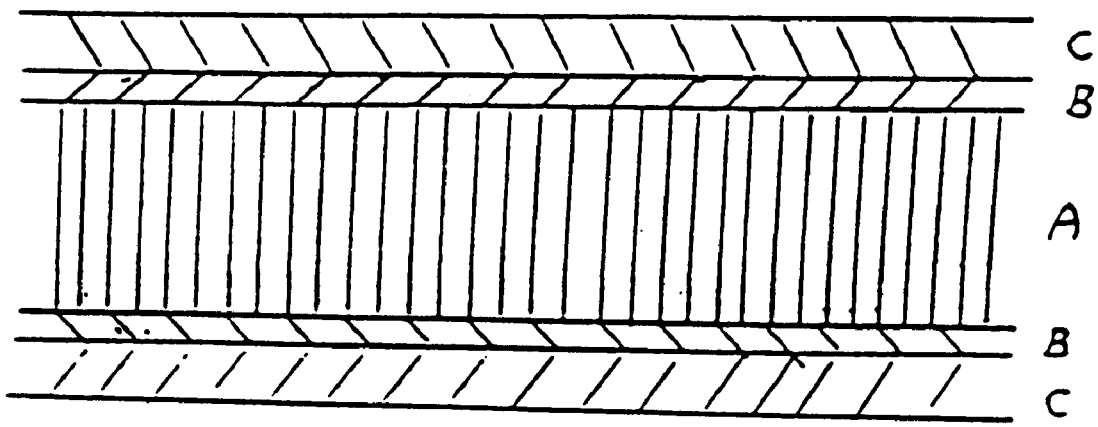
FIG. 1:
A: Frothy layer for density reducing
B: Adhesive layer for surface treating agent
C: Paper face layer for printing ink absorbing (layer of primer coating)
D: Paper face layer of high luster and low ruggedness (layer of top face coating)

In order to attain the above objects, the present invention provides a series of related technology as following descriptions:

The side feeder of this invention can directly feed the inorganic filler into the extruder without the step required in prior arts for aquiring master batch made from inorganic filler and resin first, and then mixing it with PP resin to be fed in extruders. This will certainly save operation steps and decrease the cost.

The smooth pressing treatment of this invention adopts facility which reach the requirements of excellent smoothness, high gloss and low specific gravity, through working on surface coating laminates by the thermo-softing pressing device.

The paper aquired from this process almost owns the same amount and crosslinking of minute pores as those of art paper, and has a better quality for printing dryness over traditional synthetic paper. Besides, its ruggedness is $0.5\mu$ which provide high printing resolution.

For the understanding of technical content of present invention, here we provide the description on the aspects including coating object, which is white opaque resin of biaxially oriented PP, surface bottom, constitution and making process of surface coatings comprising extrusion, three-layers co-extrusion, cooling, biaxially orientation, electric halo treatment and rolling, laminate gluing, surface treatment, and smooth press treatment as follows.

The coating object, white opaque resin of biaxially oriented PP, has three layers in which the intermediate layer is extruded by a primary extruder kneading the resin composite which comprises both hopper feed-in PP resin of 50–90% weight with high crystallizability of isotacticity above 96%, and antistatic agent of 0–5% weight, and side supplier feed-in calcium carbonate of 10–40 weight, and titanium dioxide of 0–10 weight, simultaneously, two surface layers are extruded by two secondary extruders kneading the resin composite which comprises PP of 95–99.5% weight and adhesion resistant agent of 0.5–5% weight. The extrudates extruded from the three extruders mentioned above are then co-flown and extruded through a same T-type die to form a paper sheet of three layers, and make it through biaxially orientation and electric halo treatment. Furthermore, utilize the intaglio coating roller in order to coat the back surface of the required composite with the coatings consisted of chlorinated PP resin of 5–20% weight, acrylate of 0–5% weight, calcium carbonate of 0–40% weight, clay of 0–45% weight, titanium dioxide of 0–5% weight, ultraviolet absorbent of 0.1–0.3% weight, toluene of 31–50% weight, antistatic agent of 0–3% weight, and antioxidant. After this step, to put the opposite surface of this coated composite to be coated again by utilizing the intaglio coating roller with the coatings consisted of liquid resin of acrylic ester of 10–20% weight, antifoaming agent of 0.2–0.5% weight, calcium carbonate of 0–48% weight, clay powder of 0–45% weight, titanium dioxide of 0–5% weight, water resistant agent of 0.2–0.7% weight, lubricant of 0.5–2% weight, starch of 0–6% weight, ammonia of 0.2–0.8% weight, fluorescent dye of 0.01–0.1% weight, and pure water of 26–30% weight. At last, finish with smooth press treatment by smooth press device which is consisted of, heating metal roller and high-temperature resisted plastic roller, in order to obtain a biaxially oriented PP synthetic paper of high gloss and easy-drying printability.

This invention adopts PP of high crystallizability as the essential raw materials to be suitable for cultural paper. The PP resin used by the coating object of this invention is homogeneous polymer with high crystailizability of melt flow index (MFI) 2–6 (230° C./2.16 kg, ASTM D1238) and most of it is isotactic. Such a high molecular configuration allows a tidy array between molecular chains, and the magnitude of molecular weight and the distribution state will also influence the mechanical strength and the quality homogeneity of synthetic paper. The preceding calcium carbonate of coating object plays the function for significantly decreasing the specific weight of coating stuff down to be under 0.6 before adding antifoaming agent, due to its unregular configuration which extends minute pore gap during the biaxially oriented process, and thus provides the coating object of excellent opacity. In addition, for preventing the dispersion of inorganic fillers, it can be blended with PP resin to form master batch first. Moreover, the inorganic filler could be calcium carbonate, silica, clay, calcium silicate or clay, etc., The preceding titanium dioxide raw material of coating object is mainly retile type titanium dioxide which provides the function for adjusting the shading quality of synthetic paper and straightening the effect of ultraviolet resistance.

The preceding antistatic agnet of coating object could be the same as those used in the biaxially oriented PP, in which the electrovalence of electron of the grade 3 amine can eliminate the static effect caused in the coating process.

In order to prevent the mutual adhesion between the paper membranes occurring during the coating object rolling process, the adhesion resistant agent is required, and generally it may be the current silicon dioxide for BOPP. In addition, the present invention adopts the coating stuff with 3-layer structure; wherein the front layer and the back layer are set for obtaining better adhesion and surface quality during the cooling process. If considering shading and the stickiness, it may be added with inorganic fillers such as calcium carbonate, titanium dioxide, clay calcium silicate, clay, etc., or to be used with single layer structure as the coating object.

The preceding PP chloride resin of the back coating object is mainly functioned as producing the adhesive ability for the surface of non-polarize coating object, of which the polyethylene may be used as raw material if the chloride extent is 20–40%.

The preceding acrylic resin of paper surface treatment agent is mainly used for improving the rigidness, cut durability and the weatherability of paper surface. However, it could be abandoned for use, if considering the paper softness.

The calcium carbonate and clay of the above-mentioned back coating mainly provides functions for improving the dry ability of ink while printing, whose particle diameter is between 0.5–5µ. In addition, tripoli, calcium silicone, or clay may be adoped as a raw material, too. The titanium dioxide of the above-mentioned back coating mainly provides functions for reaching a better whiteness, visual quality, ultra-violet resistance, and shading of the synthetic paper.

The antistatic agent of the above-mentioned back coating comprises mainly amide which functions for eleminating the static effect caused in printing process.

In order to prolong the life cycle of the synthetic paper of the present invention and to prevent ageing and decomposing from UV action, the UV absorbent of 0.05–0.15% weight is used.

In order to prevent the paper surface interaction with oxygen in the air to influence the surface strength, the back coating also adopts anti-oxidant which may be the same as those used in any kinds of plastic products.

The liquid acrylic ester resin of front coating is primarily used for adhesion among calcium carbonate, titanium dioxide, and clay, and also good for adhesion with back coating. In practical use colloid type is better than either solution or suspension, which belongs to synthetic adhesives. In addition to liquid acrylic ester resin, if the weatherability is not concerned, the substitutes may be styrene-butadiene latex, butadiene-acrylonitrile emulsion, polyvinyl acetate, vinylidine chloride polymer, butyl latex, polyvinyl alcohol, or cellulose derivatives.

The starch raw material of above-mentioned front coating is also used for adhesion whose high adhesive character is helpful for the adjustment of the adhesive degree of coatings. Either natural starch or converted starch of carbonhydrates is available for use though their adhesive strength and soluble adhesion are somewhat different from each other.

The calcium carbonate, clay, and titanium dioxide of above-mentioned front coatings provide functions which are good for ink drying ability, printability, and qualities of whiteness, glossiness, opague degree, and ruggedness which can be adjusted according to requirement. Besides, other fillers such as aluminas, silicas, barium sulphate, satin white, zinc oxide, calcium sulphite, miscellaneous pigments, or slurry fillings like calcium sulphite slurry, and clay slurry, may be used to meet with its purposes.

The antifoaming agent of above-mentioned front coating is mainly used for avoiding froth in the front face coating, and to influence the surface quality and related coating process. The formation of foaming is primarily relevant to the surface of coatings and the tension, adhesion, blend degree, temperature, pH value of surface, and delivery condition of coating.

The water-resistant agent of above-mentioned front face coating mainly acted for the increase of paper strength and prevention of water action which results the abnormal printing, in the meantime, to improve the transfer of ink.

The lubricant of above-mentioned front coating mainly used for the improvement of coatings' fluidity and the upgrade of printing quality, which may be soluble soap, latex emulsion, resin, amide, non-soluble soap.

The ammonia of the above-mentioned front coating is mainly used for the adjustment of pH value to obtain a better stability of chemical additives in coatings.

The additive amount of fluorescent dye of the above-mentioned front face coating is quite small, which is mainly used for the adjustment of the hue of paper surface.

Figure 2:
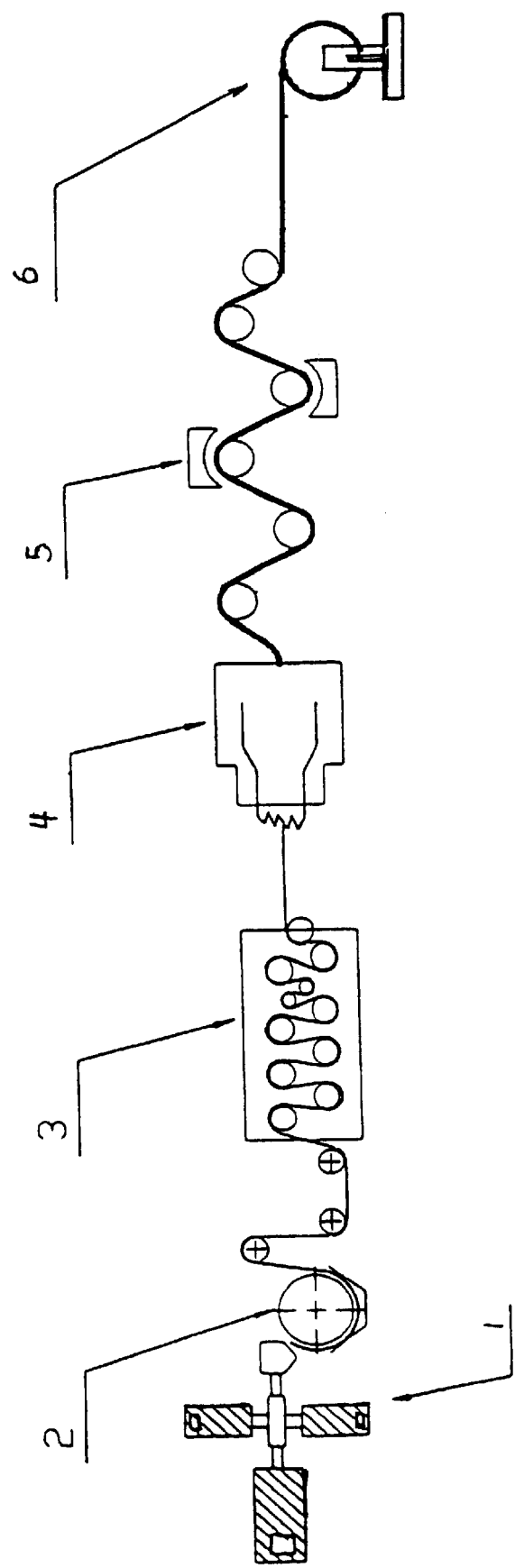
FIG. 2:
(1)Extruding device
(2)Cooling and shaping device
(3)Longitudinal orientation device
(4)Lateral orientation device
(5)Corona Discharge treatment device
(6)Rolling device

The devices in pursuance of the process of present invention are further described as follows:

1. Extruder device (FIG. 2-1): Comprising one primary extruder with two side-feeders, and two secondary extruders whose temperature conditions very with the raw material of resin composite, MFI, crystallinity, viscosity, additive and production line speed which(rolling speed) normally is set in the range between 200–280° C. The three layers' structure of coating stuff of present invention is achieved with 3-layer co-extrusion, where the 3-layer extrudate forms a co-flow at the T-type die for 3-layer co-extrusion through a designed combination of T-type die flow path.

2. Cooling and shaping roller device (FIG. 2-2): Adopting the water cooling or air cooling device to cool and form the 3-layer co-extrudate of high temperature between 180–280° C. The control of cooling temperature in this process is quite important, which promises the success of the steps of following process. The cooling temperature is normally set at 15–80° C., adjustable depending on the thickness of synthetic paper and the speed of production line.

3. Longitudinal orientation device (FIG. 2-3): The cooled and shaped sheet is fed in this device for pre-heating to soften the paper sheet at 120–150° C. (depending on the thickness of required paper sheet and the speed of production line), and then oriented in one or two phases with low and high speed so as to enhance the longitudinal mechanical strength of coating object which is then tempered and formed. In general, the longitudinal orientation magnification is set at 3–6 times.

4. Lateral orientation device (FIG. 2-4): The thinner paper sheet formed through the foregoing longitudinal orientation treatment is preheated and softened at 150–190° C. (depending on the thickness of paper sheet and the speed of production line) and then laterally oriented and finally tempered and formed so as to partially reduce the dimension of coating object for it's stability. Generally, the lateral orientation magnification is set at 5–12 times depending on the required feature of product.

5. Corona discharge treatment (FIG. 2-5): This treatment is to improve the surface characteristics of coating object for enhancing the adhesion between coating stuff surface and paper surface treating agent, where the device of high frequency wave discharging with a power of 20–150 KW is used (depending on the speed of production line) so as to obtain a surface moisturizing tension of 36–45 dyne/$cm^2$.

6. Rolling device (FIG. 2-6): The coating object of present invention is rolled to be an end product with 8M width by a tubular device, and then can be striped to meet the coating requirements.

7. Laminating device (FIG. 3): If the thickness of produced coating object is over $200\mu$, it will be laminated by this laminating device. Before laminating, the surface of each layer is coated, however, the type of coating roller is selected depending on the spreading amount of coating and the viscosity of primer which should be suitable for the addition product of polyamide-ester series or other polyamide and polyamide-imide and acrylic ester polymer of grade 4 ammonium to laminate PP substance. The preceding device disposes two rolls of synthetic paper coating object with same or different thickness below 100/i at the distributive stage of the coating and the laminating ((1), (5) of FIG. 3) respectively, the coating object at the distributive stage of coating ((1) of FIG. 3) is coated through a concave plate coating roller ((2) of FIG. 3) which can dip out the glue from glue tank ((3) of FIG. 3) for coating. The coating objet which has being coated is then passed through a dryer ((4) of FIG. 3) at 30–70° C. to eliminate the solvent in the glue. After this stage, the coating object is laminated with another coating object of same or different thickness from other distributive stage of laminating ((5) of FIG. 3) on the laminating roller((6) of FIG. 3) at 40–70° C. The laminated coating object then would be rolled by a rolling machine ((7) of FIG. 3) to form an end product with a thickness more than $200\mu$.

8. Surface treating device (FIG. 4): The coating object over $200\mu$ thickness produced by the device of FIG. 1 and laminated by the laminating device is then treated with surface finishing to form a surface layer with large amount of minute pores and excellent quality of crosslinkage of pores which are as good as natural paper surface layer. This device is 4 plates of each face, and does work by double faces on line coating. It puts the coating object below or above $200\mu$ thickness on the distributive zone ((1) of FIG. 4) of coating, through the concave coating roller of plate 1 ((2) of FIG. 4) to coat the paper surface treating agent on the surface of coating object for the first surface treatment. After this step, the treated object is dried by the dryer ((3) of FIG. 4) set between the plate 1 and plate 2, and then through the concave coating roller of plate 2 ((4) of FIG. 4) for the second surface treatment. At last, this afore second treated object is sent to the drying zone of bottom layer of a 20M large dryer for completely drying to let the solvent totally volatilized. All these steps finish the treatment of the first paper surface. On the same way, sending the other surface of the coating object through the dryer ((7) of FIG. 4) on the concave coating roller between plate 3 ((6) of FIG. 4) and plate 4, then the fourth concave coating roller ((8) of FIG. 4). Finally, it enters the top layer drying zone of a 20M large dryer ((9) of FIG. 4) for the second surface coating, and is rolled by a rolling device. This coating device could be single double-faces coating, or selected one, two, three or four times coating. The plate depth of concave plate coating roller may be $15\mu$–$60\mu$. The concave plate coating roller can be replaced by the offset coating roller for the coating of coating object.

9. Smooth press device (FIG. 5): The coating surface over or under $200\mu$ of thickness which have been coated by the surface treating device is done by a smooth press treatment to form a fairly smooth and high gloss (Also, we can change the coating stuff formula for snow white paper product.

This device is consisted of two sets of metal roller and plastic roller. It can be combined with the surface treating device for the on-line production of coating and smooth press. The coated half-done product on the distributive zone ((1) of FIG. 5) of smooth press is sent through the first set of press device with the metal roller set on the top of the plastic roller on lower area ((2) of FIG. 5), then would be forwarded to the second set of press device with the plastic roller set on the top of the metal roller for smooth press. At last, to be rolled by the rolling device.

In order to understand the technical content of this invention, we provide some embodiments to describe it in detail. This includes the production of writing, printing, packaging and various uses of synthetic paper. However, these examples can not be explained as limitations of the scope of this invention.

Embodiment 1:

A biaxially oriented PP synthetic paper of double-side and easy-drying printability with a thickness below $200\mu$. (sample 1 enclosed).

The PP (MFI:2–3) of 60% weight and anti-static agent of 2% weight are mixed by a mixer and fed in the primary extruder from the main feeder, in the meantime, the powder of calcium carbonate of 30% weight and titanium dioxide of 8% weight are fed in the primary extruder from 2-side feeders. On the other way, PP of 99% weight and adhesion resistant agent of 1% weight are mixed by a mixer and fed in two secondary extruders. At the extruders temperature of 180–280° C., these mixtures are extruded through the same one T-type die by means of 3-layer co-extrusion. At the temperature 15–80° C. of cooling roller, the PP coating sheet is cooled and shaped and then fed in the lateral orientation device for preheating at 150–185 and 9-time orientation, and then tempered and cooled to control the shrinkage rate. After this step, the coating sheet is sent for electric halo treatment to equip with better face strength. Finally, it is rolled up by a rolling machine, and obtains coating object with thickness below $200\mu$. Here is the example for how to use the coating object of biaxially oriented PP synthetic paper with $130\mu$ thickness of double-side printing and easy drying, and the, surface treating device, to produce a 2-side paper with each face of $8\mu$ thickness of primer coating and facial coating. (2 plates for each face, double-sided on-line process)

The coating object with 130/i thickness is laid on the distributive zone of coating first, then sending it through the concave coating roller of 180 meshes and 25/i plate depth of the front plate 1. Use PP chloride resin of 5% weight, acrylic ester resin of 5% weight, calcium carbonate of 40% weight, clay of 5% weight, titanium dioxide of 3% weight, toluene of 41.7% weight, static resistant liquid of 1% weight, UV absorbent of 0.2% weight and oxidation agent, to be a primer, to finish the primer coating of the front plate 1, then through the dryer between 2/plates to be dried at 100–150° C. After drying, send it through the concave coating roller of 150-meshes and 3.5/i plate-depth of plate 2, and acrylic ester resin liquid (of 40% solidity) of 15% weight, starch of 3% weight, defroth agent of 0.3% weight, water-resistant agent of 0.5% weight, lubricant of 1% weight, calcium carbonate of 10% weight, clay of 40% weight, titanium dioxide of 2% weight, dye of 0.005% weight, ammonia of 0.5% weight, pure water of 27.65% weight to be a top coating for finishing the facial coating of the front plate 2, and then send it to the 20M large dryer for 100–150° C. completing drying work. The coating object which has been completed 2-time coating of front face, then would be sent to the concave coating roller of 180-meshes and 25μ plate depth of the opposite face plate doing the same process of primer coating as those done in the front face for opposite face. After coated by opposite facial plate 1, then the coating object would be sent to be dried at 100–150° C. by the dryer between 2 plates, then through the concave coating roller of 150 meshes and 35μ plate depth of opposite facial plate 2 to be coated, then entering the 26M large dryer to be dried completely at 100–150° C. Finally, it will berolled by a rolling machine. The coated half-done product will be set on the distributive zone of smooth press device to be smooth finished separately for the front face and the back face by passing through the assembly of the metal roller and the plastic roller with temperature 180° C. and linear pressure 50 kg/mm, then would be rolled by rolling machine.

The biaxially oriented PP synthetic paper of high gloss and easy dry printability of 140/i double face (sample 1 enclosed) produced by the preceding steps has excellent quality for printing drying, for instance, the outer layer of printing can be dried within 2 minutes, and will be totally dried for the entire printing layer. The degree of gloss will be higher than 70%, and the ruggedness will be 0.5μ that can be extensively applied for writing, printing and packaging of kinds of cultural paper uses. The physical property of the synthetic paper of this invention is shown in table 1.

Embodiment 2:
A biaxially oriented PP synthetic paper of double-sided and easy-drying printability with a thickness over 200/i (sample 2 enclosed).

Here is an example for the production of the biaxially oriented PP synthetic paper 280μ of double-sided easy drying printability by using the laminating device and the surface finishing device (sample 2 enclosed).

Figure 3:
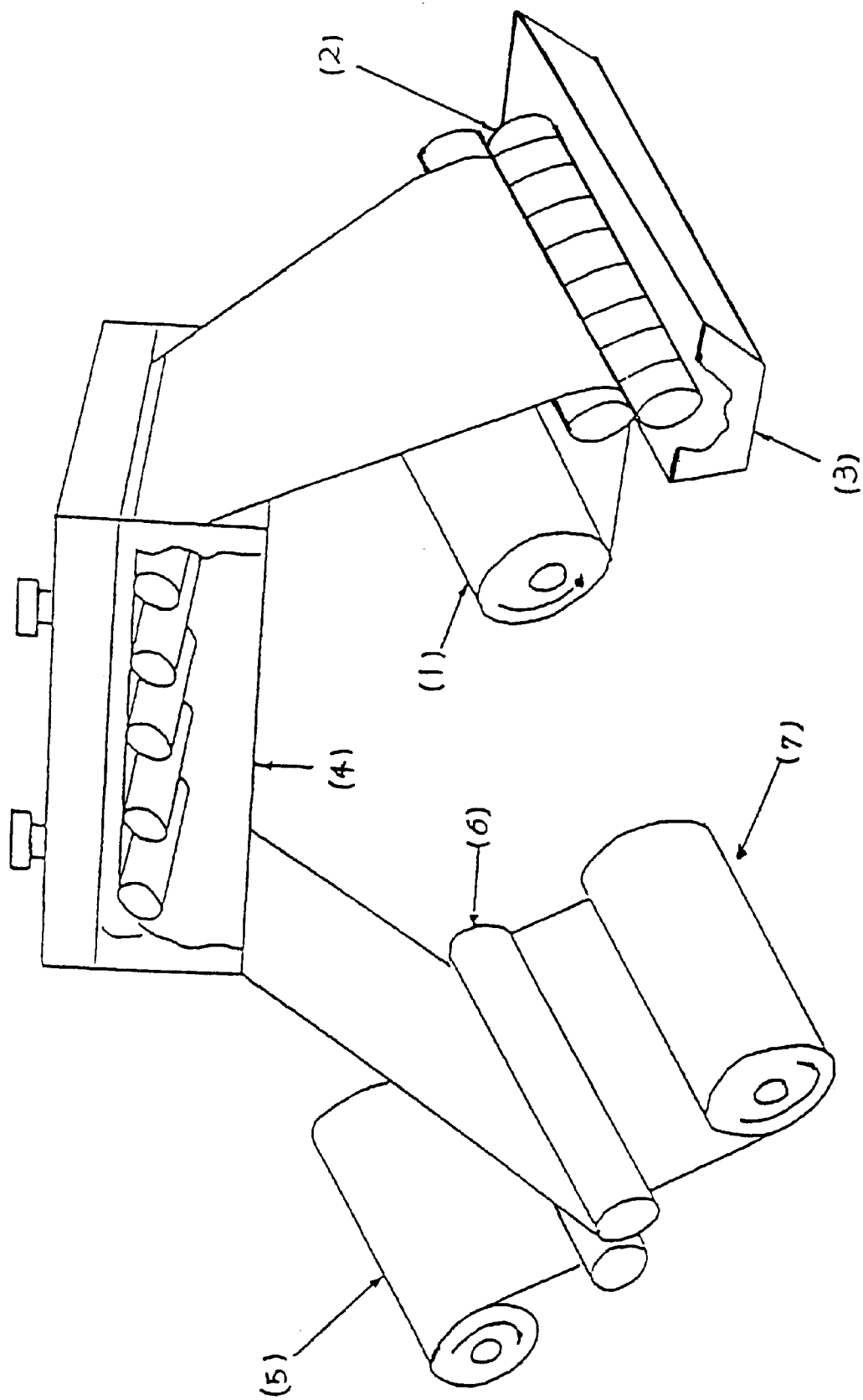
FIG. 3:
(1)Distributive zone of gluing
(2)Concave gluing roller
(3)Glue tank
(4)Dryer
(5)Distributive zone of laminating
(6)Laminating roller
(7)Rolling machine
Figure 4:
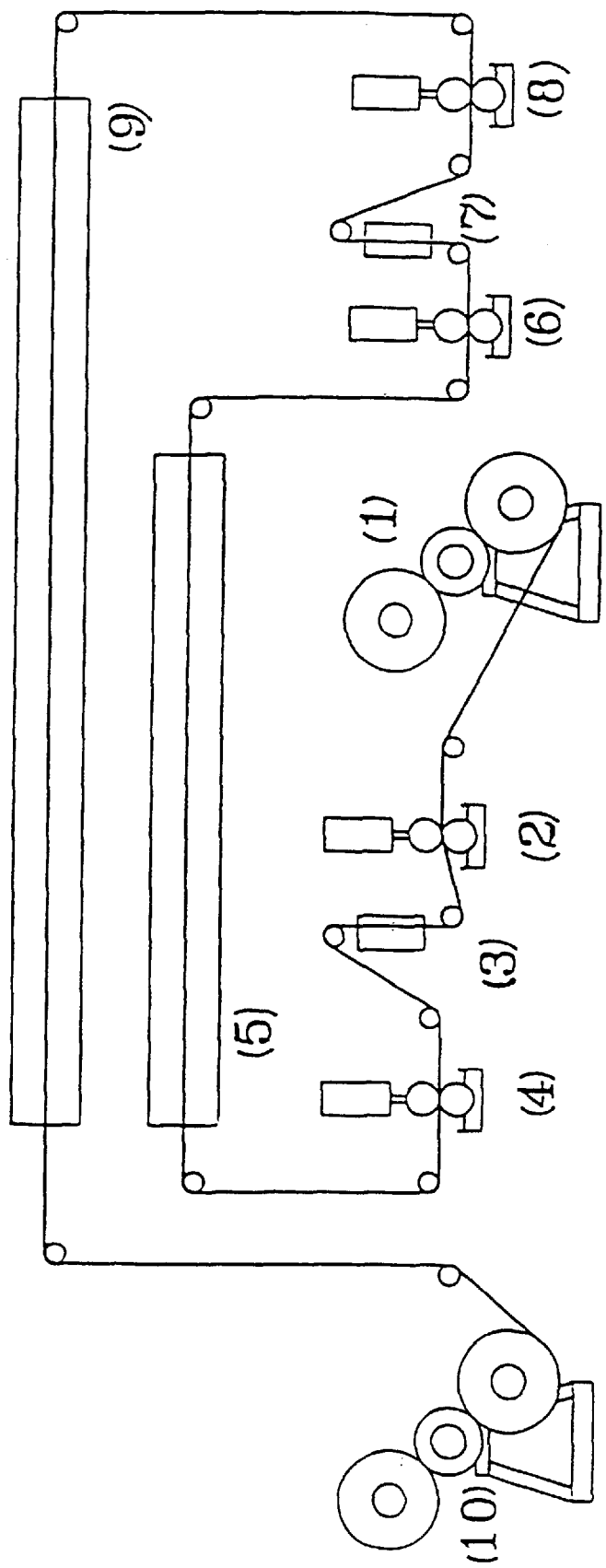
FIG. 4:
(1)Distributive zone of coating
(2)Concave coating roller (Front facial plate 1)
(3)Dryer between plates
(4)Concave coating roller(Front facial plate 2)
(5)Bottom layer of Dryer
(6)Concave coating roller(Opposite facial plate 1)
(7)Dryer between plates
(8)Concave coating roller(Opposite facial plate 2)
(9)Top layer of dryer
(10)Rolling machine
Figure 5:
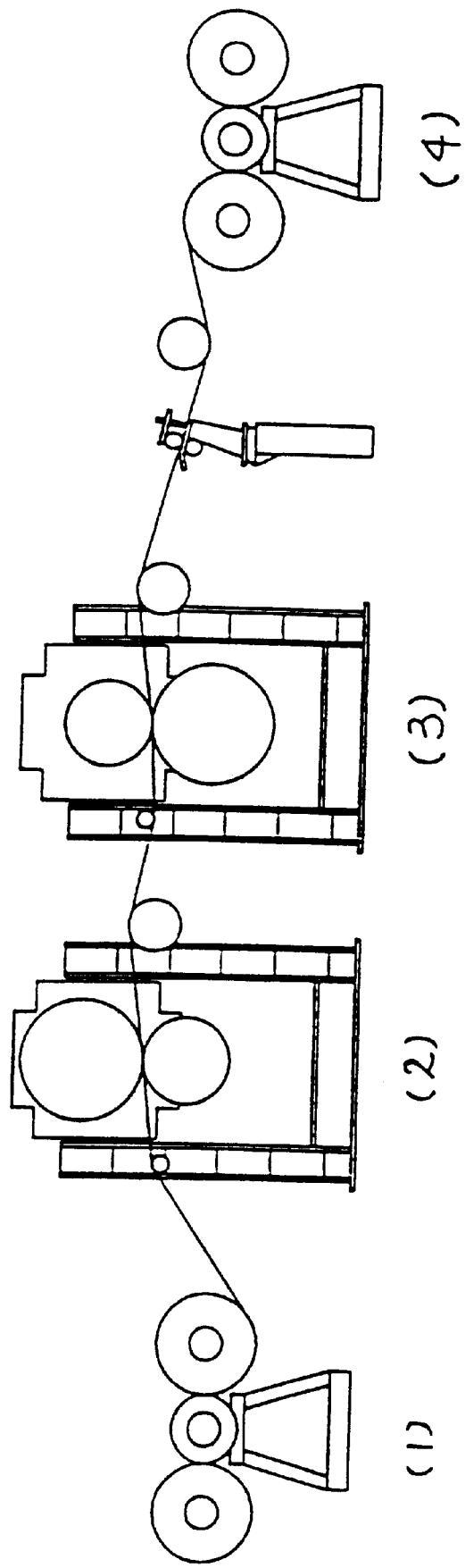
FIG. 5:
(1)Distributive zone of smooth pressing
(2)Smooth pressing set 1 (Smooth pressing of front face)
(3)Smooth pressing set 2 (Smooth pressing of back face)
(4)Rolling and smooth pressing zone
Figure 6:
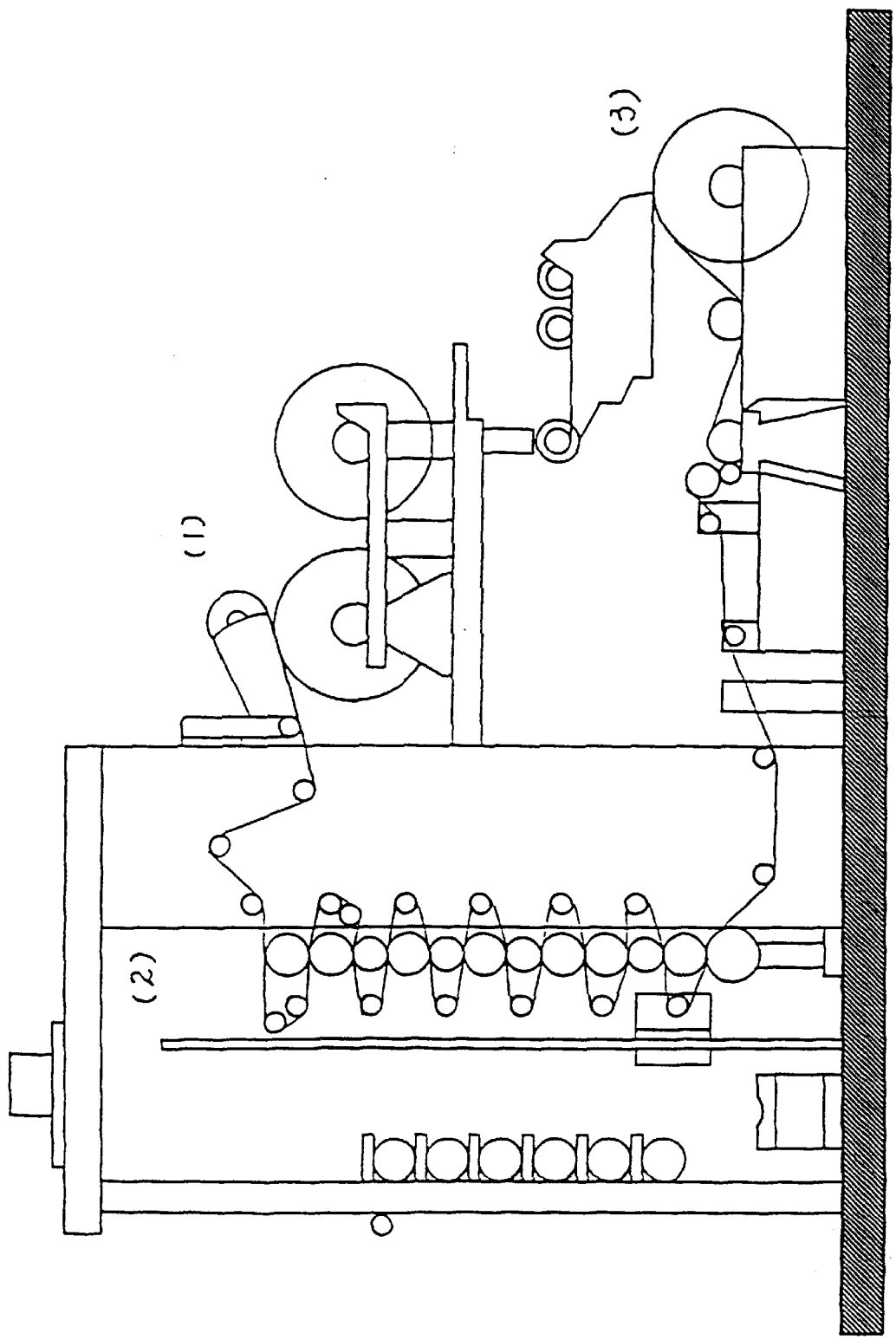
FIG. 6:
Super smooth pressing drawing:
(1)Distributive zone of smooth pressing
(2)Smooth pressing device
(3)Smooth pressing and rolling zone

Put 2 rolls of coating object 135/i on the distributive zone of gluing and laminating separately ((1), (5) of FIG. 3), where the coating object 135/i on the distributive zone of gluing ((1) of FIG. 3) will be glued by dipping out the glue from glue tank ((3) of FIG. 3) for gluing), and then the glued object will be forwarded to the dryer ((4) of FIG. 3), 10 m long, temperature 70–100° C., to be dried to eliminate the solvent in the glue. After this step, the glued and dried coating object, thickness 135μ, will be laminated with another coating object from other distributive zone of laminating ((5) of FIG. 3) at laminating roller of 40° C.–50° C. ((6) of FIG. 3). After lamination, the coating object will have a thickness of 270μ, and be rolled by rolling machine to become a 270μ coating object ready for the surface finishing.

At this time, use the formula processing condition and smooth press condition of the primer and the top coating described in embodiment 1 for surface coating. By these steps, we can obtain a biaxially oriented PP synthetic paper of high gloss and easy-drying printability of double faces with a thickness of 280μ. The physical property of synthetic paper of this invention is shown in table 1.

TABLE 1

The physical property of synthetic paper of this invention

| Items of physical properties | Embodiment 1, 140μ | Embodiment 2, 280μ |
|---|---|---|
| Specific gravity, g/cm³ (ASTM D1248) | 0.75 | 0.77 |
| Basic weight, g/m² (JIS P-8124) | 105.0 | 215.6 |
| Whiteness, % (ASTM E131) | 90.0 | 90.0 |
| Opacity, % (TAPPI T425) | 95.0 | 97.0 |
| Glossiness, % (TAPPI T480) | 72.0 | 73.0 |
| Ruggedness, μ (TAPPI T555) | 0.5 | 0.5 |
| IGT Face desquamation resistance | Non-desquamation | Non-desquamation |
| Tensile Strength kg/mm² (ASTM d882) | | |
| MD Orientation | 8 | 9 |
| CD Orientation | 15 | 17 |
| Stretching rate % (ASTM D882) | 30 | 30 |
| MD Orientation | 130 | 130 |
| CD Orientation | 30 | 30 |
| Tear strength g (ASTM D1922) | | |
| MD Orientation | 40 | 45 |
| CD Orientation | 25 | 30 |
| Drying time of outer printing layer | within 2 minutes | within 2 minutes |
| Drying time of total layer | within 20 minutes | within 20 minutes |

I claim:

1. A process for the production of a biaxially oriented polypropylene synthetic paper of easy-drying printability, which is characterized in which the polypropylene resin composite blended by those fed in the primary extruder from hopper including the polypropylene resin (Melt Flow Index: 0.5–6) of 50–90% weight with high crystallinity of isotacticity above 96% weight and the antistatic agent of 0–5% weight, and those fed in the primary extruder separately from two feeders including the calcium carbonate of 10–40% weight and titanium dioxide of 0–10% weight, is simultaneously with other polypropylene resin composite blended by polypropylene of 95–99.5% weight and adhesion resistant agent, to be extruded separately from one primary extruder and two secondary extruders (at temperature 180–280° C.) to be co-flown and extruded through a same T-type die to form a coating sheet of 3 layers and then the said coating sheet is cooled and shaped at 15–80° C., then to do biaxially orientation which includes the preheating at 120–150° C., orientation, and tempering of 3–7 time magnification of longitudinal orientation, and the reheating at 130–190° C., orientation and tempering of 5–12 time magnification of lateral orientation, then to do corona discharge treatment of high frequency wave with 20–150 KW power, then to be rolled by rolling machine to form a coating object of a thickness below 200μ thereto, using the prime coating consisted of chlorinated polypropylene resin of 5–20% weight, acrylic ester resin of 0–5% weight, calcium carbonate of 0–40% weight, toluene of 31–50% weight, anti-static agent of 0–3% weight, UV absorbent of 0.1–0.3% weight, and antioxidant of 0.1–0.3% weight to be coated on the said coating object by the concave coating roller of 100–400 meshes, and 10–60$\mu$ plate depth, and then, to use the top coating consisted of liquid acrylic ester resin of 10–20% weight, anti-foaming agent of 0.2–0.5% weight, calcium carbonate of 0–48% weight, clay powder of 0–45% weight, titanium dioxide of 0–5% weight, water resistant agent of 0.2–0.7% weight, lubricant of 0.5–2% weight, starch of 0–6% weight, ammonia of 0.2–0.8% weight, fluorescent dye of 0.01–0.1 weight, and pure water of 26–30% weight for the top coating process of the above primer coated object by the concave plate coating roller of 100–400 meshes and 10–60$\mu$ plate depth, and then to be rolled to form a half-done product of synthetic paper of a thickness below 200$\mu$ whose both faces then would be smooth pressed at temperature 40–200° C., linear pressure 10–500 kg/mm by a smooth press device consisted of heated metal roller and plastic roller of high temperature resistance, and again be rolled by a rolling machine to be a synthetic paper of a thickness below 200$\mu$.

2. A process for the production of a biaxially oriented polypropylene synthetic paper of high gloss and easy-drying printability, which is characterized in which the two rolls of coating object made from the process of claim 1 are put separately on the distributive zone of gluing and laminating of the laminating device, wherein the coating object required for gluing is glued, dried and laminated at laminating roller with another roll of coating object from the distributive zone of laminating to become a coating object of a thickness above 200$\mu$, and then to be rolled by a rolling machine, wherewith the formula of coatings (prime coating and top coating), process of coating and conditions of smooth press in claim 1 for the surface finishing work, and then be rolled by a rolling machine to obtain a biaxially oriented synthetic paper of high luster and easy-drying printability of a thickness above 200$\mu$.

\* \* \* \* \*